United States Patent [19]

Carteau et al.

[11] Patent Number: 4,786,994

[45] Date of Patent: Nov. 22, 1988

[54] METHOD OF AND APPARATUS FOR CONTROLLING THE DISPLACEMENT OF A MOVABLE SYSTEM DRIVEN BY AN ELECTRIC MOTOR

[75] Inventors: Daniel Carteau, Limours; Jean-Jacques Couette, Montigny le Bretoneux; Christian Maury, Velizy; Pham Dan Tam, Bagneux, all of France

[73] Assignee: Cii Honeywell Bull, Paris, France

[21] Appl. No.: 803,508

[22] Filed: Nov. 29, 1985

[30] Foreign Application Priority Data

Nov. 29, 1984 [FR] France ................... 84 18156

[51] Int. Cl.⁴ ................................ G11B 5/54
[52] U.S. Cl. ...................... 360/75; 360/105; 318/331; 318/561; 318/578
[58] Field of Search ............ 360/75, 78, 103–107, 360/109; 318/561, 567, 575, 578, 590, 331

[56] References Cited

U.S. PATENT DOCUMENTS

| | | | |
|---|---|---|---|
| 4,202,020 | 5/1980 | Lougren et al. | 360/75 |
| 4,571,648 | 2/1986 | Barski | 360/105 |
| 4,660,106 | 4/1987 | Harrison et al. | 360/75 |

FOREIGN PATENT DOCUMENTS 56-80856 7/1981 Japan ........................... 360/75

Primary Examiner—Raymond F. Cardillo, Jr.
Assistant Examiner—Steven R. Garland
Attorney, Agent, or Firm—Lowe, Price, LeBlanc, Becker & Shur

[57] ABSTRACT

A DC motor drives a magnetic disk memory transducer head between a position proximate the disk periphery to an area on the disk where data are located during which time the head is lowered from an idle to a hovering position. During this time the motor is supplied with a current impulse having a predetermined polarity, amplitude and duration. The polarity of the current impulse is opposite to that of current applied to the motor while the head is being driven between a position beyond the disk periphery to the position proximate the disk periphery. The duration and amplitude of the current impulse are such that the motor angular velocity has a zero value at the completion of the current pulse. Thereafter, a ramping voltage having an average linear waveform is applied to the motor to prevent overshoot of the motor speed and prevent oscillation of the head relative to a face of the disk. The linear ramp current decreases to a zero value, at which time the motor has a constant, non-zero angular velocity.

18 Claims, 7 Drawing Sheets

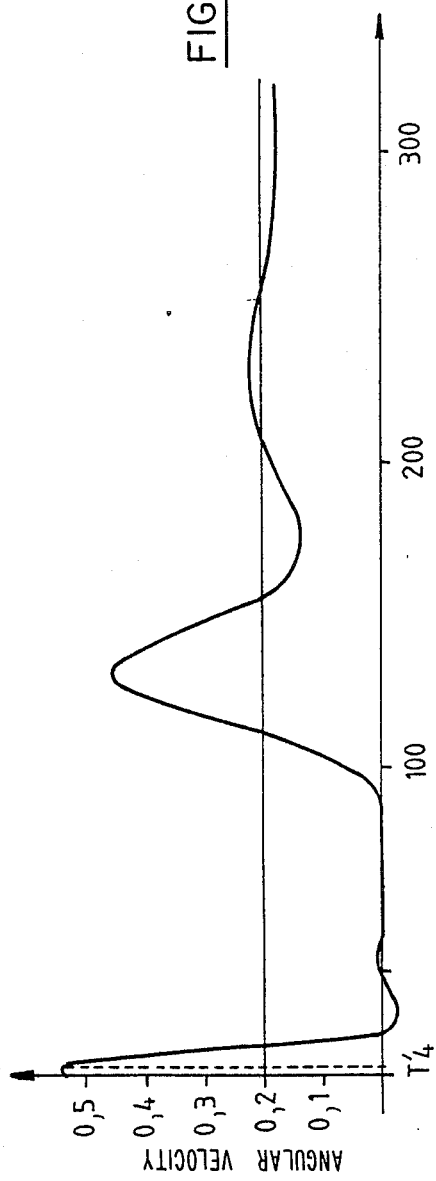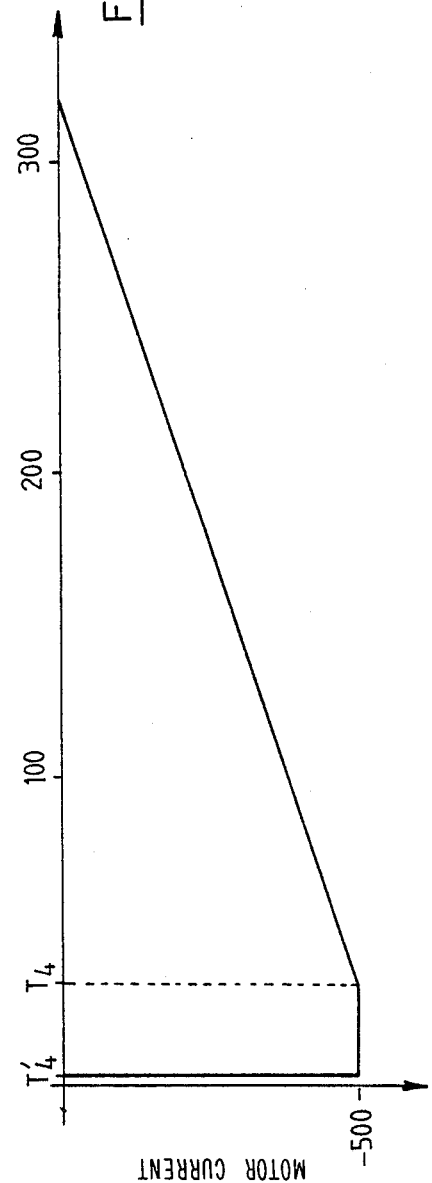

METHOD OF AND APPARATUS FOR CONTROLLING THE DISPLACEMENT OF A MOVABLE SYSTEM DRIVEN BY AN ELECTRIC MOTOR

FIELD OF THE INVENTION

The present invention relates generally to a motor drive system and apparatus and more particularly to controlling a motor by applying an excitation impulse having a predetermined polarity, amplitude and duration to cause the motor to have zero velocity and thereafter ramping the excitation for the motor through a zero value so that the motor is driven to a predetermined speed without overshoot.

BACKGROUND ART

The present invention is described in connection with the preferred embodiment, as a drive mechanism for a transducer head of a magnetic disk memory. It is to be understood, however, that the invention is, in certain instances, applicable to any motor drive system.

Information is written into and read from circular concentric tracks of magnetic disk memories by read/write transducers, located an extremely small distance above faces of disks of the memory. The transducers are driven radially relative to a turning axis of the disk faces to enable data to be written into or read from all of the concentric tracks on each of the disk faces. During read and write operations, the disks are driven at constant rotational velocity.

A single read/write transducer is associated with each face of a magnetic disk in such a memory. The transducer is mounted on a platform which travels parallel to the disk face and is driven by a linear or rotary electric motor. The platform includes two principal components, namely a head including the transducers and a suspension device. One extremity of the suspension device is an integral part of the head, while the other extremity of the suspension device is an integral part of a rigid arm, in turn an integral part of an output shaft of an electric motor.

Generally, the head including the read/write transducer or transducers associated with one of the disk faces is shaped as a relatively flat rectangular parallelipiped, having an underside facing the disk and containing the transducer. The head includes a large, upper side parallel to the underside, and containing the ends of electric wires connected to the transducer and to electronic read and/or write circuits of the disk memory. A platform of this general type is described in U.S. Pat. No. 4,261,024, commonly assigned with the present invention.

When data are written into and read from the disk, the transducer hovers above the disk face with which it is associated, whereby a layer of compressed air is formed between the underside of the platform head and the disk face. The compressed air layer prevents the head from touching the disk, thereby preventing disk damage. The distance or hovering height between the disk face and the underside of the head is referred to as h. When the platform is at the hovering position, a dynamic balance is provided by opposing the force created by the air cushion on the underside of the platform with a force, referred to as a "load force" directed in the opposite direction from the air cushion force. The load force is applied to the top of the head and has a modulus equal to that of the force established by the air cushion. The load force is relatively light, on the order of 10 to 15 grams, and is supplied by a load plate, an integral part of a fixed, rigid arm for carrying the head. It is difficult to maintain the head at the hovering position. When the disk memory is not operating, the head is parked or located at an "idle position" near the disk periphery off of the disk. In the idle position, the separation height H between the underside of the head and the plane of the disk associated with the head is considerably greater than the hovering height h. In order for the head to begin to hover, the head must be moved from the idle position, at a height H several tenths of a millimeter above the disk face, to a stable hovering position at a height h, several tenths of a micron above the disk surface. Lowering the head from the idle position to the hovering position is difficult, primarily because of air turbulence near the face of the disk.

There is an increasing tendency to employ magnetic disk memory systems having rotary, rather than linear, activated arms for displacing transducer containing heads and for loading the heads into the hovering position. The rotary arm is typically an integral part of a drive mechanism coupled to a rotary electric motor. The drive mechanism typically includes a structure for lifting and lowering the head between the hovering and idle positions. Such a system is described, for example, in copending, commonly assigned U.S. application Ser. No. 467,202, filed, Feb. 16, 1983, U.S. Pat. No. 4,571,648.

In the system described in the copending U.S. patent application, the positioning mechanism is mounted on a ball bearings. Each head is loaded into the hovering position by a load plate having one extremity connected by an articulated joint to an arm, forming an integral part of a rotary positioning mechanism. A head suspension device is mounted at the other extremity of the load plate. The load plate is mechanically connected to a wire on which rests a follower mounted on a extremity of a spring plate connected by an articulated joint to the arm which is an integral part of the drive mechanism. The follower engages a camming surface or profile of a fixed cam. In one preferred embodiment, the camming surface includes two break points, to divide the camming surface into three distinct sections.

A head is radially displaced and loaded into the hovering position from the idle position in three sequential phases. Each of the three sequential phases corresponds to a position of the cam follower on one of the three sections of cammed surface. The three phases defined by the position of the follower and the three sections of the cam are:

1. The unlocking phase, wherein the rotary drive mechanism is activated between an immobilized or locked condition and a released condition, at an idle height or distance H above the plane of the disk face associated with the head and at a radial position beyond the disk periphery.

2. Driving the head radially, between the position beyond the disk periphery to a position in proximity to the periphery of the disk, while maintaining the head at the idle height H above the plane of the disk.

3. Changing the height of the head between the idle height H and the hovering height h while driving the head radially from in proximity to the disk periphery to a region above the edge of where concentric data tracks are provided in the disk.

In phases 1, 2, and 3, the cam follower is driven across three distinct and different portions of the camming surface. In the first and third phases, the rotary drive mechanism drives the cam follower through less than a complete revolution, while the follower is driven through one complete revolution in phase 2, which defines the center section of the camming surface or profile. In phase 3, a tensile load exerted by the follower on a load plate coupled thereto and carrying the head gradually decreases as the head moves from the idle to the hovering position, to enable the plate and head to be lowered gradually toward the face of the disk. The load plate pulls the head toward the face of the disk in such a way that when the follower reaches the end of its travel, at the end of the third section of the camming surface, the head is in a stable hovering position. When the head reaches the stable hovering position above the face of the disk, the head is said to be loaded. When the head is loaded, the follower no longer engages the camming surface.

When the head is retracted from the loaded or hovering position to the locked position, the cam follower traverses the three sections of the cam surface in the opposite direction, whereby the sequence goes from phase 3 to phase 2, to phase 1. This is referred to as the unloading phase, in contrast to the sequence from phase 1 to phase 2 to phase 3, which is termed the loading phase.

The head displacement and load system may be likened to a movable system which travels along a given trajectory formed by three sections of a cam surface. The movable system including the head displacement and load system is subsequently referred to herein as a mobile component formed of a follower traveling along a cam profile or cam surface and having the same mass and inertia as a head displacement and loading system.

It has been found that as the mobile component completes one cycle over a trajectory of the cam surface and begins another cycle, the resistive, frictional forces opposing the motion of the mobile component along the cam surface are subject to variations up to 50%. Thus, the frictional forces may vary 10 to 15 grams between adjacent cycles of the same machine. Similar observations have been made for different disk memories. The variations are primarily due to changes in environmental factors, such as temperature, humidity, and amount of static electricity in the air.

As the mobile component travels along the cam surface, certain major problems have been found to subsist because of the considerable variation in the frictional forces opposing the motion of the follower along the cam surface. While the mobile component is being unlocked, i.e., while the follower travels along the first section of the cam surface, it has been found desirable to determine when the follower reaches the intersection between the first and second cam sections. Because of the possible variations in frictional forces between adjacent locking and unloading cycles, the cam follower is likely to reach the first break point at different times, even though the same voltage and current are applied to the electric motor driving the mechanism including the follower.

When the follower travels along the second section of the cam surface and reaches the second break point, the velocity of the mobile component should fall within two predetermined values. If the velocity of the mobile component is less than a predetermined value, there is a likelihood that the cam follower will travel backward away from the second break point. If, however, the velocity of the mobile component when the cam follower reaches the second break point is greater than a predetermined value, it is likely that the motor speed is excessive, causing the head to crash onto the disk as it is loaded during the third phase. This obviously has devastating results to both the disk and the head. While the head is being loaded onto the disk, from the idle position, H to the hovering height h during the third phase, the head velocity must fall in a range between a pair of predetermined values (e.g. between 8 and 16 millimeters per second). If the head velocity is excessive during the third phase, there is a risk that the head will crash onto the disk. If the head falls at too slow a rate during the third phase, the head and the mechanism carrying it are likely to oscillate unstably, which may also cause the head to strike the disk.

Thus, it is important for the motor shaft to be displaced at a controlled velocity while the follower is moved on the third section of the cam surface. The motor shaft is likely to be subjected to a sudden drive force as soon as the cam follower has cleared the second break point of the cam surface, as it reaches the third phase. This is because there is a tendency to impart a sudden acceleration to the cam follower when it makes the transition from the second to the third section of the cam surface. It can be shown that the driving power to the motor decreases as a function of the distance of the mobile component relative to the second break point, i.e., the drive power decreases as the distance of the cam follower from the second break point increases as the cam follower moves along the third section of the camming surface.

THE INVENTION

In accordance with a first aspect of the present invention, a member arriving at a predetermined location is driven to a zero velocity, and is then driven to a predetermined velocity, without substantial overshoot. The result is achieved by initially applying an excitation impulse having a predetermined polarity, predetermined constant amplitude and predetermined constant duration to a DC motor for driving the member. The current impulse has a polarity opposite to the current impulse which was applied to the motor to drive the member to the predetermined location; the amplitude and duration of the current impulse are such that the motor shaft drive and the member have zero velocity at the end of the impulse. Because of the inertia of the motor and the member driven thereby, the velocity of the motor and member have a tendency to overshoot the zero value. This tendency is obviated in accordance with the present invention by ramping the current applied to the motor from the predetermined amplitude toward a zero value. The current ramp has a predetermined duration and slope to prevent the overshoot and drive the member so the member has a constant velocity when the ramp reaches a zero value. After the current ramp has reached the zero value, it continues through the zero value, to a finite amplitude which is maintained constant for a brief interval to maintain velocity constant.

In accordance with a further aspect of the invention a transducer head of a magnetic disk memory, after having arrived at a region of the disk where the edge of annular data tracks is located, is supplied with a current which maintains the head in a hovering position, above the plane of the disk face, without imparting possibly destructive oscillating motion to the head relative to the disk face. An assembly including a radially extending arm carries the head and is driven by a rotary member. The assembly includes mechanical structure synchronized with the turning of the assembly so that as the head is driven between a position proximate the disk periphery and the edge of the disk area where data are located the head height above the disk face drops from an inoperative or idle position to a hovering or operative position.

A drive shaft for the DC motor driving the assembly falls within a predetermined permissible velocity range having minimum and maximum velocities of $V_1$ and $V_2$, respectively, at the time the head encounters the edge of the data. The values of $V_1$ and $V_2$ are determined as a function of the drive mechanism, resistive frictional forces inherent in the mechanism, static electrically between the head and the disk face, and other factors.

To prevent the head from oscillating, i.e., to prevent overshoot, which could cause the head to strike the disk with permanent damage to both, a current impulse having a predetermined polarity, magnitude and duration is applied to the DC motor immediately after the head has been driven to the disk periphery from a locked position beyond the disk periphery. The polarity of the current impulse is opposite to the polarity to the current impulse which is applied to the motor as the motor drives the assembly from the position beyond the disk periphery to the position proximate the disk periphery. The duration and amplitude of the current impulse are determined by the values of $V_1$ and $V_2$, as well as the inertia, resistive frictional forces of the assembly, and static electricity subsisting between the disk face and head. When the current impulse is completed, the motor drive shaft has a zero velocity.

Because of the inertia of the motor and the assembly driven thereby, there is a tendency for the motor angular velocity to overshoot the zero velocity value. The overshoot has a tendency to make the head oscillate up and down relative to the disk face, with possible destructive effects. The velocity overshoot effect is obviated by ramping the motor current toward zero upon the completion of the current impulse which caused the motor shaft velocity to drop to zero. The slope and duration of the current ramp are selected in such a manner as to obviate the overshoot tendency and to cause the motor to have an angular velocity in a predetermined range as the current ramp approaches and reaches a zero amplitude.

According to a further aspect of the invention, a method for displacing a movable system for loading magnetic transducer heads along a trajectory determined by a third section of a cam surface is arranged such that when the head is loaded, the head velocity falls within a predetermined range. The frictional forces to which the head is subjected remain constant for a given cycle, but are subject to variation from one cycle to another, and from one disk memory to another. In addition, while the head travels along the trajectory determined by the cam surface, it is subjected to a driving force which decreases as a function of the distance of the cam follower along the third cam section, relative to the second break point in the cam surface.

A preferred method of and apparatus for displacing the head while the cam follower is moved along the second section of the cam surface between the two break points of the cam surface is claimed in the copending commonly assigned U.S. patent application Ser. No. 803,509, entitled "Method Of And Apparatus For Displacing A Movable System Driven By An Electric Motor Along A Given Trajectory", filed concurrently herewith. In accordance with the method and apparatus of the copending application, the angular velocity of the motor driving the head falls between two predetermined values when the pin clears the second break point in the camming surface.

In accordance with the present invention, the motor angular velocity drops to zero a predetermined time after the cam follower has reached the second break point of the cam surface. The motor angular velocity is reduced to zero by applying a damping current to the motor armature. The motor shaft is then driven with a controlled velocity causing the motor shaft to be in a velocity range between two predetermined values when the head arrives at the hovering point.

According to the invention, a movable system driven by a DC electric motor is displaced along a trajectory from a departure point where the system has an indeterminate velocity to a given destination point where the system is subjected to a driving force having an intensity which decreases as a function of the distance of the movable system relative to the departure point. The system is also subjected to constant resistive, frictional forces for the duration of a particular cycle of travel along the trajectory. The constant resistive forces, however, are subject to substantial variations from one travel cycle to another. To drive the movable system to the destination point so that the velocity of the movable system falls within two predetermined values a control current is applied to the motor in such a way as to cause the movable system to have a given reference velocity, preferably zero. The velocity of the movable system is then controlled by applying a decreasing current amplitude to the motor. The current amplitude decreases from the value of the control current required to provide the reference velocity such that the mobile component velocity falls between a pair of predetermined values when the mobile component arrives at the destination point. The control current is preferably a damping current initially having a predetermined amplitude and duration to cause the reference (preferably zero) velocity to be achieved. Thereafter, the control current preferably varies as a ramp having a linear average variation between the predetermined amplitude and zero.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWINGS

FIGS. 5A, 5B and 5C are waveforms of the current (I) in a rotary electric motor during travel of the displacement and loading system along the cam wherein:

FIG. 5A is the motor current waveform to attain unlocking of the displacement and loading system (the mobile component);

FIG. 5B is the motor current waveform when the displacement and loading system travels along the cam between the two break points in the slope, in accordance with the invention;

FIG. 5C is the motor current waveform from the time the displacement and loading system has cleared the second break point in the slope;

FIGS. 6A and 6B are waveforms for enabling the duration of the damping current in the motor to be experimentally determined, from the time when the displacement and loading system has cleared the second break point in the slope;

DETAILED DESCRIPTION OF THE DRAWINGS

To provide a better understanding of the present invention, the composition and operation of one prior art magnetic head transducer displacement and loading system SCT are now reviewed by referring to FIGS. 1-4. System SCT comprises rotary positioning mechanism POSROT, an integral mechanical part of drive shaft ARBE of rotary DC electric motor ACRO. Head T is moved between a loaded position, where it hovers at height h above disk DISC, and an idle or unloaded position where it is at a greater distance H above the disk by apparatus DISAD that is turned by mechanism POSROT relative to fixed cam CAM. Rotary positioning mechanism POSROT includes a light weight, metallic armature ARMOB that extends radially relative to the axis of rotation of shaft ARBE, and is fixedly mounted on the shaft to turn therewith. At the end of armature ARMOB is fixedly mounted support arm BS, which extends generally tangentially to the radial direction of arm ARMOB and which carries head loading and unloading apparatus DISAD.

Head loading and unloading apparatus DISAD includes load plate LAM for head T, to which a suspension device (not shown) for heat T is mechanically connected. Head T is connected to one end of tension wire F, having another end anchored to arm BS in proximity to the intersection of the arm and armature ARMOB. An intermediate portion of wire F contacts spring plate LRS, fitted with cam follower P and fixedly mounted to supporting arm BS.

Figure 1A:
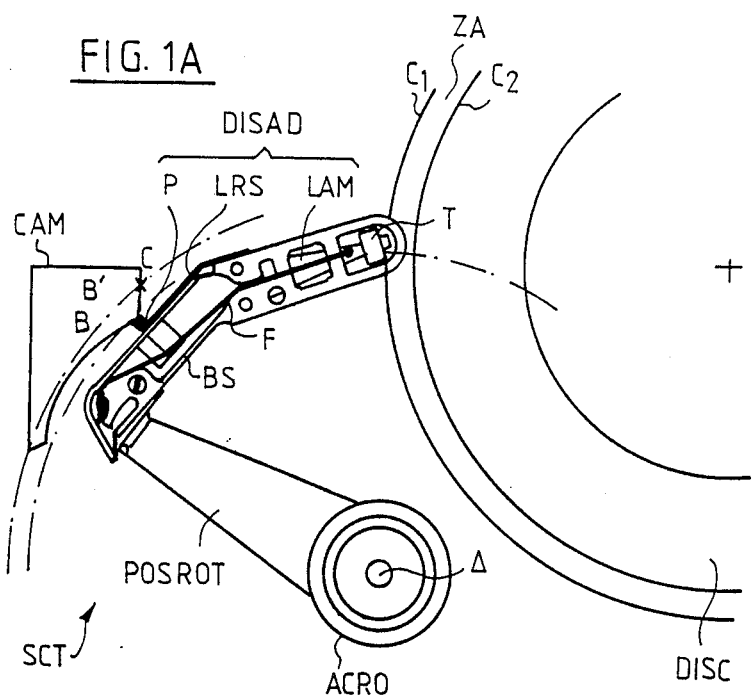
FIGS. 1A and 1B are top views of the relative positions of a rotary electric motor and head displacement and loading system including a cam and cam follower, in combination with a magnetic disk, in the two following situations:
  the head not loaded (not in the hovering position) above the disk (FIG. 1A);
  the head loaded (in the hovering position) over the disk (FIG. 1B)
Figure 1B:
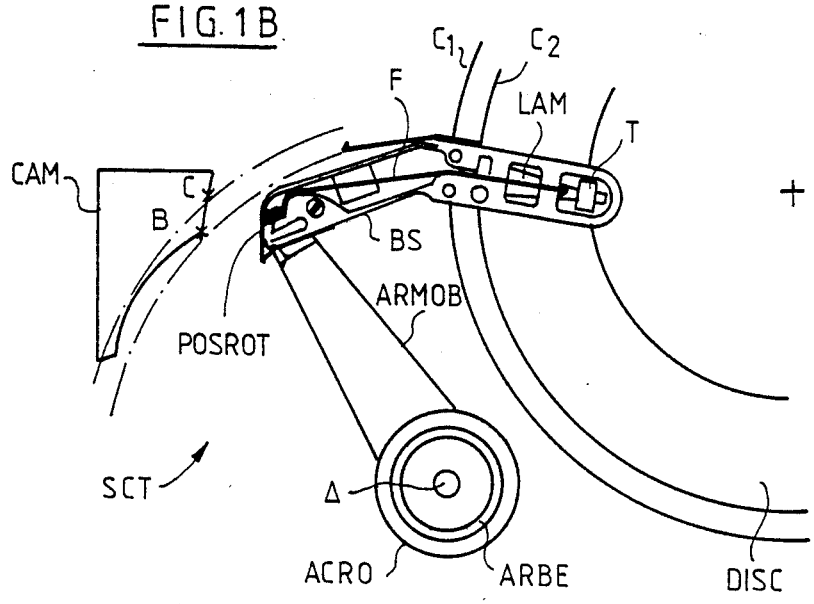

The motion of head loading and unloading apparatus is controlled by cam follower P moving along a cam surface of fixed cam CAM, as head T is moved from a locked position beyond the periphery of disk DISC at idle height H above the disk to a position in proximity to the periphery of disk DISC, at radius $C_1$ at height h, as illustrated in FIG. 1A, to radius $C_2$, the edge of where data are located in the disk at hovering height h, as illustrated in FIG. 1B.

Figure 4:
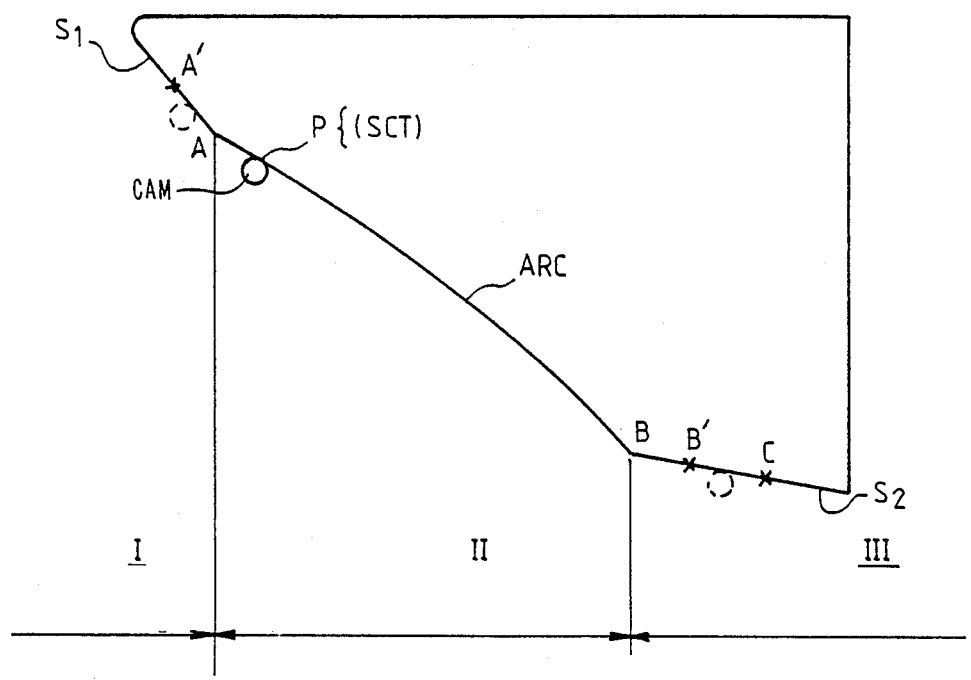
FIG. 4 is a detail drawing of the cam and the cam profile thereof with three sections and two slope break points.
Figure 3:
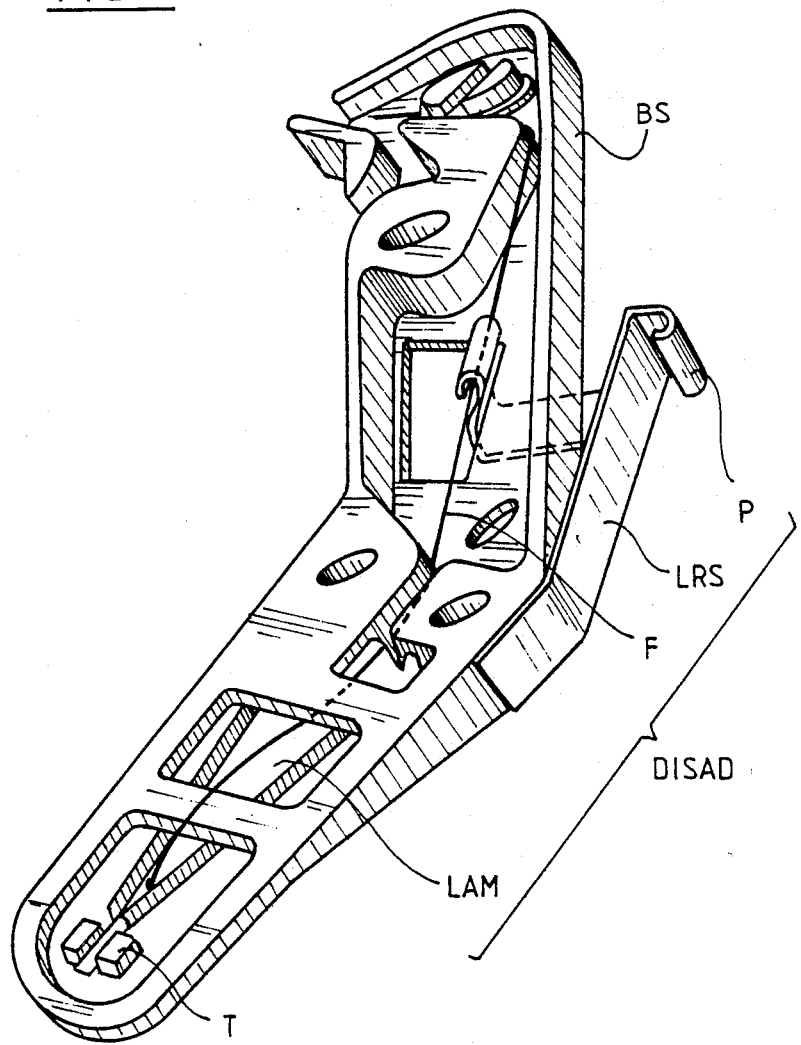
FIG. 3 is a side perspective view in detail of part of the head displacement and loading system.

Cam CAM has a profile or camming surface illustrated in FIG. 4 as including two straight line segments $S_1$ and $S_2$ separated by an arcuate surface ARC, which subsists between break points A and B. Arcuate surface ARC defines a sector of a circle displaced by a radius from the axis of rotation $\Delta$ of shaft ARBE. Cam follower P travels along a straight line from point A' to break point A, thence along arc ARC to break point B, thence along another straight line to point C. Thus, during a displacement operation by system SCT of head T, follower P sequentially travels along camming surfaces A'A, AB and BC to unlock and load the head. Conversely, when head T is being activated from a loaded to an unloaded and locked condition, follower P sequentially travels along profile sections CB, BA, AA'.

Figure 2A:
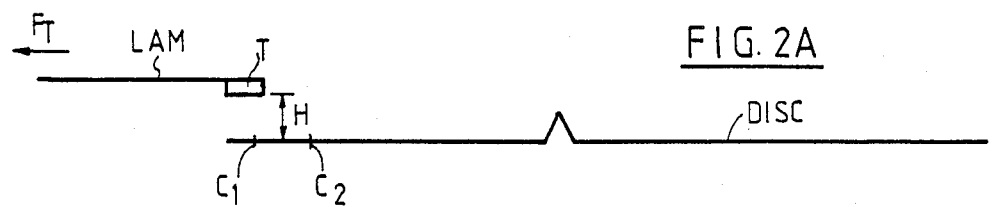
FIGS. 2A and 2B are schematic side views of the relative positions of the head and the disk wherein:
  the head is not loaded (FIG. 2A);
  the head is loaded (FIG. 2B)
Figure 2B:
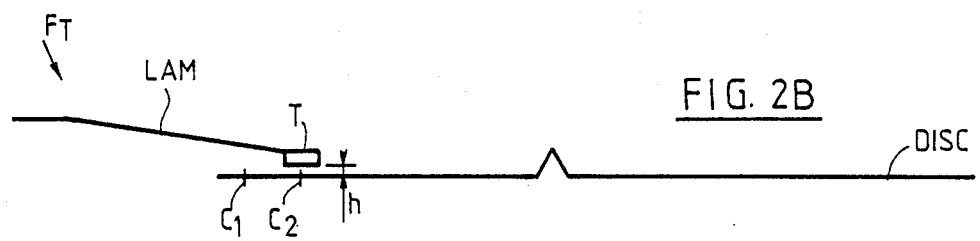

The loading and displacement operations of head T on disk DISC are performed in three sequential phases, as illustrated in FIGS. 1 and 2, as follows:

Phase 1. Unlocking

Initially, follower P is at position A', to the left of break point A, as illustrated in FIG. 4, and system SCT is immobilized or locked. To load head T on disk DISC, system SCT is unlocked by applying a current to rotary electric motor ACRO. Shaft ARBE, armature ARMOB and arm BS rotate in a clockwise direction, as illustrated in FIGS. 1A and 1B, causing cam follower P to move along the camming surface from point A' to break point A. At this time, wire F is maintained in a taut position, whereby head T is outside of the periphery $C_1$ of disk DISC and is at a height H above the plane of the disk. In response to follower P reaching the first break point A of the camming surface of cam CAM, phase two is initiated.

Phase 2. Bringing the heads to the loaded position.

During phase 2, follower P travels along the arcuate portion ARC of the camming surface, between break points A and B in response to motor ACRO driving shaft ARBE and armature ARMOB about shaft rotation axis $\Delta$. During phase 2, head T is brought from its initial position, removed from the periphery of disk DISC while in the locked position, to a position above the disk, facing the disk periphery $C_1$. During phase 2, head T travels in a plane parallel to the plane of disk DISC, whereby the head remains at distance H from the disk planar face. During phases 1 and 2, follower P is positioned such that spring plate LRS exerts a torsional force on wire F, which in turn exerts a tensile load $F_T$ (FIG. 2A) on loading plate LAM. Tensile load $F_T$ maintains head T at height H above the planar face of disk DISC. In response to follower P clearing the second break point B on cam CAM phase 3 is initiated.

Phase 3. Loading

Follower P travels from the second break point B on cam CAM to point C on line segment $S_2$ of the cam surface. In response to such movement of follower P, spring plate LRS is urged away from the edge of supporting arm BS, causing wire F to release the tensile load $F_T$ on load plate LAM, in turn causing the load plate to descend toward the planar face of disk DISC. Thereby head T is loaded over the planar face of disk DISC, so that the distance between the underside of head T and the opposed planar face of disk DISC is h, a hovering height on the order of several tenths of a micron. Further rotation of motor ACRO in the clockwise direction causes follower P to leave the camming surface of cam CAM. At the time follower P engages point C on the camming surface, head T is above circle $C_2$, concentric with circular disk periphery $C_1$, but at a radius less than the disk periphery. Typically, data subsists in the portion of disk DISC having a radius less than circle $C_2$. Motor ACRO is thereafter controlled to position to head T at a desired radial track in the data region of disk DISC, in a manner well known to those skilled in the art.

Thus, system SCT includes a movable follower pin P which travels along trajectory A'ABC. While pin P travels trajectory A'ABC, the movable system driving the pin is subjected to resistive frictional forces which remain constant during one cycle of the trajectory, but are likely to vary from one cycle to another. The variations are likely to occur within the same disk memory at different times or in different disk memories because different memories have different characteristics.

Because of the variations in the resistive frictional forces which system SCT encounters, which can vary by as much as 50%, the application of a predetermined current amplitude for a predetermined duration to motor ACRO may not properly displace head T to a hovering position from a locked condition or vice versa. To attain proper conditions for the displacement of head T from the locked position to the hovering position, it is necessary for motor ACRO to displace system SCT in a minimum time period, and to load head T so that the motor shaft angular velocity falls within a predetermined range between predetermined maximum and minimum values at the time pin P engages break point B. For example, if the travel time of system SCT is excessively short, head T is likely to strike the face of disk DISC, or pin P will not clear break point B to prevent head T from being loaded properly above the face of disk DISC.

The present invention relates to a method of and apparatus for displacing a movable system SCT which is an integral part of DC rotary electric motor ACRO. System SCT includes pin or cam follower P that is driven along cam surface BC. In accordance with the invention, the disadvantages described above involving displacing the movable system during phase 3 of the cycle under optimum conditions are obviated, regardless of environmental conditions. The optimum conditions involve reaching point C in a minimum time and ensuring that the angular velocity of motor shaft ARBE and the velocity of head T fall in predetermined ranges when pin P reaches point C. To provide a better understanding of the context in which the method and apparatus according to the present invention operate and to clarify the description, the method and apparatus are described as part of a more detailed description than provided above of the three phases for displacing and loading head T.

Figure 5A:
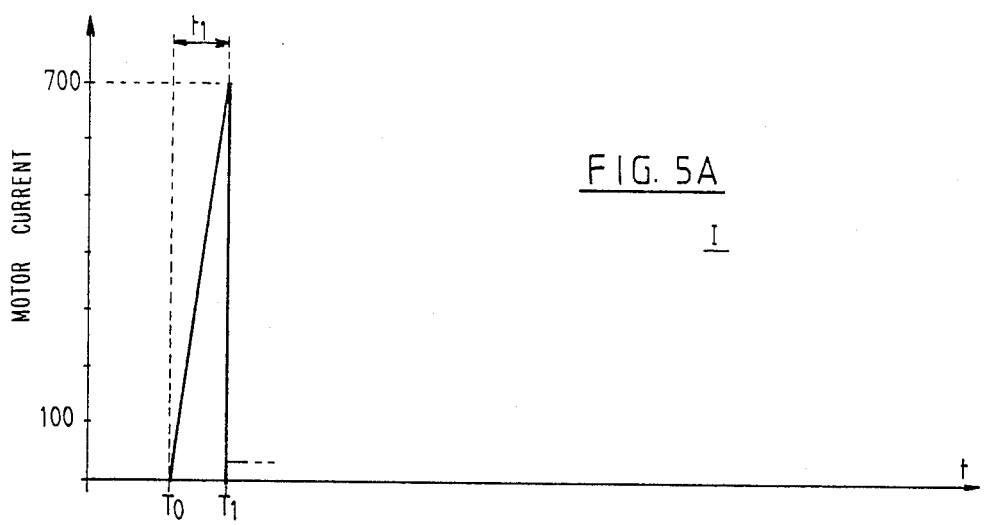

During phase 1, a ramp current amplitude is applied to the armature of rotary DC motor ACRO; as illustrated in FIG. 5A, the ramp current has an amplitude which increases linearly as a function of time. During phase 1, the position of the drive system responsive to rotation of motor shaft ARBE is monitored to determine when pin P reaches point A on the cam surface of cam CAM. A preferred apparatus for detecting when pin P reaches break point A, as well as break point B, is described infra, in connection with FIG. 7.

The linear positive current ramp illustrated in FIG. 5A begins at time $T_0$ and ends at $T_1$ when it is determined that pin P has reached break point A. The time interval $T_1 - T_0$ is typically on the order of 25 to 30 milliseconds. The initial current ramp supplied to the armature of DC motor ACRO varies typically from 0 to 700 milliamperes between times $T_0$ and $T_1$. When pin P reaches break point A, the drive for motor ACRO is shifted from the waveform illustrated in FIG. 5A to the waveform illustrated in FIG. 5B. The waveform illustrated in FIG. 5B is the current waveform applied to motor ACRO during phase 2, i.e., as pin P is traversing the cam surface between break points A and B.

Figure 5B:
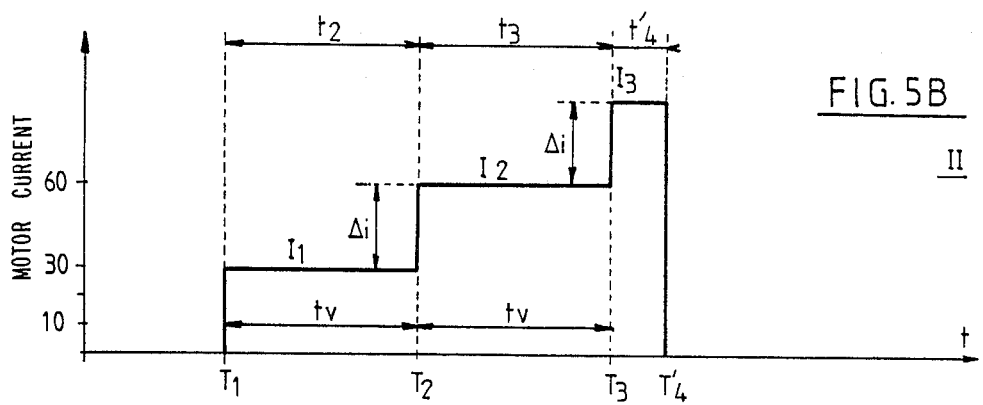

The waveform of FIG. 5B is a continuous step excitation waveform having a positive polarity. Each of the steps has a constant amplitude that differs from the immediately proceding step by the same predetermined incremental value, $\Delta i$. All of the steps, except the last step, have the same predetermined time duration $t_v$ referred to as a validation time. The duration of the last step is no longer than the duration of the previous steps, but the last step is terminated when pin P arrives at break point B.

In the specific example of FIG. 5B, at time $T_1$, a current impulse $I_1$, having an amplitude equal to 30 milliamperes, is applied to rotary DC motor ACRO. In the stated example, pin P does not arrive at break point B during the interval $T_1$ to $T_2$ (the validation time $t_v$) typically on the order of 2 seconds. If pin P had arrived at point B prior to time $T_2$ being reached, phase 2 would have been terminated and phase 3 immediately initiated. Because pin P has not reached point B at time $T_2$, a second current impulse $I_2$ is applied to motor ACRO at time $T_2$. Current impulse $I_2$ has an amplitude which is twice the amplitude of impulse $I_1$, whereby there is an incremental current increase $\Delta i$ at time $T_2$. While current impulse $I_2$ is applied to motor ACRO, pin P continues to be moved across the camming surface between break points A and B, without reaching break point B. If, however, pin P had reached break point B, during the interval between times $T_2$ and $T_3$, equal to $t_v$, phase 2 would have been terminated and phase 3 immediately initiated. In the assumed situation, however, at time $T_3$, the current supplied to motor ACRO is again incremented by an amplitude of $\Delta i$, whereby a current impulse $I_3$ having a value equal to 3 $\Delta i$, i.e., three times the amplitude of impulse $I_1$, is applied to the motor. At time $T'_4$ pin P reaches break point B, signifying that head T is above disk periphery $C_1$, causing phase 2 to be terminated, even though impulse $I_3$ has a duration less than validation time $t_v$.

The duration of validation time $t_v$ is determined by the length L of the curved segment ARC of the camming surface between break points A and B, (in turn determined by the distance head T travels from the unlocked position to periphery $C_1$) and the minimum value $V_1$ for the angular velocity of armature ARMOB at the time pin P reaches point B (in turn determined by the minimum permissible velocity of head T when it arrives at periphery $C_1$), such that $t_v = L/V_1$. The values of the minimum and maximum angular velocities of armature ARMOB at the time pin P reaches break point B are experimentally determined. The incremental value $\Delta i$ in the waveform of FIG. 5B is experimentally determined as a function of the distance between break points A and B along arc ARC and the maximum angular velocity $V_2$ for armature ARMOB at the time pin P reaches break point B (in turn determined by the maximum permissible velocity of head T as it approaches periphery $C_1$). If the incremental value $\Delta i$ is excessive, there is a risk that the angular velocity of system SCT and of armature ARMOB in particular will exceed $V_2$, with adverse effects on head T and disk DISC when the head descends toward the disk during phase 3. Because the current applied to the armature of motor ACRO is incremented by the same value during each validation time, the angular velocity of the output shaft of motor ACRO is incremented by the same amount each time the current applied to the motor is increased during phase 2.

Phase 3 is initiated at time $T'_4$ immediately after pin P reaches break point B. During phase 3, system SCT is subjected to a driving force resulting from a reaction between cam CAM and follower P. The driving force causes movable system SCT to suddenly accelerate when pin P reaches break point B. The driving power decreases as the distance of pin P increases from point B during phase 3. Depending on the environmental conditions encountered by system SCT, this sudden acceleration of system SCT when pin P reaches point B may cause head T to descend with excessive velocity toward the disk during phase 3 which would cause the head to strike the face of disk DISC. To obviate such a possibility, it is necessary to control the motion of movable system SCT during phase 3.

To control the motion of movable system SCT during phase 3, it is initially necessary to activate the movable system so it has an initial predetermined reference velocity, preferably zero, which is attained without overshoot. When pin P reaches point B, at the beginning of phase 3, the velocity of movable system SCT is in a range between the maximum and minimum velocity values of $V_1$ and $V_2$. Immediately after pin P has moved past point B, system SCT is subjected to a sudden acceleration, causing the velocity of arm BS to be unstable and difficult to determine. Hence, control of the motion of system SCT has a tendency at this time to be unstable. It is therefore desired to activate system SCT so it has an initial reference velocity, preferably zero, at the time pin P leaves point B, at the beginning of phase 3.

To reduce the velocity of system SCT to zero when pin P leaves point B at the beginning of phase 3, a current impulse is applied to the armature of motor ACRO at time $T'_4$. The polarity of the current impulse applied to the armature of motor ACRO at time $T'_4$ is opposite to the polarity of the stair wave current levels during phase 2. The intensity and duration of the current impulse beginning at time $T'_4$ are selected in such a way that system SCT has a velocity of zero at time $T_4$, which follows time $T'_4$, such that $T_4 - T'_4 = t_4$. Time interval $t_4$ is typically on the order of several tens of a millisecond. The current pulse which subsists between times $T_4$ and $T'_4$ is referred to as a damping impulse, bearing the designation $I_F$. Impulse $I_F$ has an intensity and duration such that it immobilizes system SCT (the speed of shaft ARBE is zero) after the system has achieved maximum acceleration as pin P leaves point B. The maximum acceleration is experimentally determined.

The duration $t_4$ of impulse $I_F$ is selected such that system SCT has zero velocity without residual oscillation, i.e., no overshot, at time $T_4$, assuming system SCT has maximum acceleration while pin P is at point B. Thus, interval $t_4$ corresponds to the duration of a transitional operation during which the angular velocity $\omega$ of armature ARMOB about axis $\Delta$ decreases from the angular velocity thereof at time $T'_4$ to a value of zero at $T_4$, as illustrated by the waveform in the upper portion of FIG. 6A. When system SCT has zero velocity, i.e., the armature ARMOB is stationary, the system is balanced by the opposing forces due to the action of the driving power due to the reaction of cam CAM on follower or pin P and by the resistive torque exerted by motor ACRO and the frictional forces discussed supra.

At time $T_4$, while system SCT has zero velocity, a current is applied to the armature of motor ACRO. The current applied to motor ACRO at time $T_4$ decreases linearly as a function of time, in the manner indicated in FIGS. 5C and the lower waveform of FIG. 6B. Typically, the current ramp beginning at time $T_4$ has a duration on the order of 200 to 300 milliseconds and in the preferred embodiment is formed of a stair step wave obtained through a succession of several stages, such as ten stages, each having a duration of about 20 milliseconds. As indicated in FIG. 6A, at the completion of a predetermined interval, the angular velocity of armature ARMOB driving system SCT stabilizes at a non-zero value and remains substantially constant until pin P reaches point C on camming surface CAM. When phase 3 is completed, the current in the armature of motor ACRO is zero. A positive current pulse is then applied for a brief interval to the armature winding of motor ACRO in such a way that the head loading system reaches a predetermined end point position beyond which it cannot travel because of system design.

Consideration is now given to the technique employed for determining whether pin P has been moved to break points A and B on cam CAM. As indicated supra, sudden changes in acceleration of system SCT occur when pin P reaches break points A and B. The sudden change in acceleration of system SCT at these times is detected to determine that pin P is at one of the two break points. The change in acceleration is detected by monitoring and then differentiating the back emf generated across the armature winding of rotary electric motor ACRO.

The back emf of a rotary electric motor can be expressed as $e = -kV$, where V is the angular velocity of shaft ARBE and k is a constant. By differentiating the back emf, one obtains $de/dt = -kdV/dt = k\alpha$, where $\alpha$ is the rotary acceleration of shaft ARBE. To determine if points A and B have been reached by pin P, the voltage across the terminals of the armature of motor ACRO is measured, differentiated and the resulting differential is compared to a given threshold value. The threshold value is experimentally determined so that it is substantially greater than the average acceleration of shaft ARBE as system SCT drives pin P over trajectories A'A and AB. Because the acceleration changes at points A and B differ, the threshold values used to determine whether system SCT has driven pin P to points A and B generally differ. Thus, there are in general two different thresholds, one for trajectory A'A, another for trajectory AB. By measuring the back emf at the terminals of motor ACRO and by differentiating this back emf, a detection system is provided that obviates the need for external sensors, such as optoelectronic sensors responsive to the motion of the system and associated amplifiers.

Figure 7:
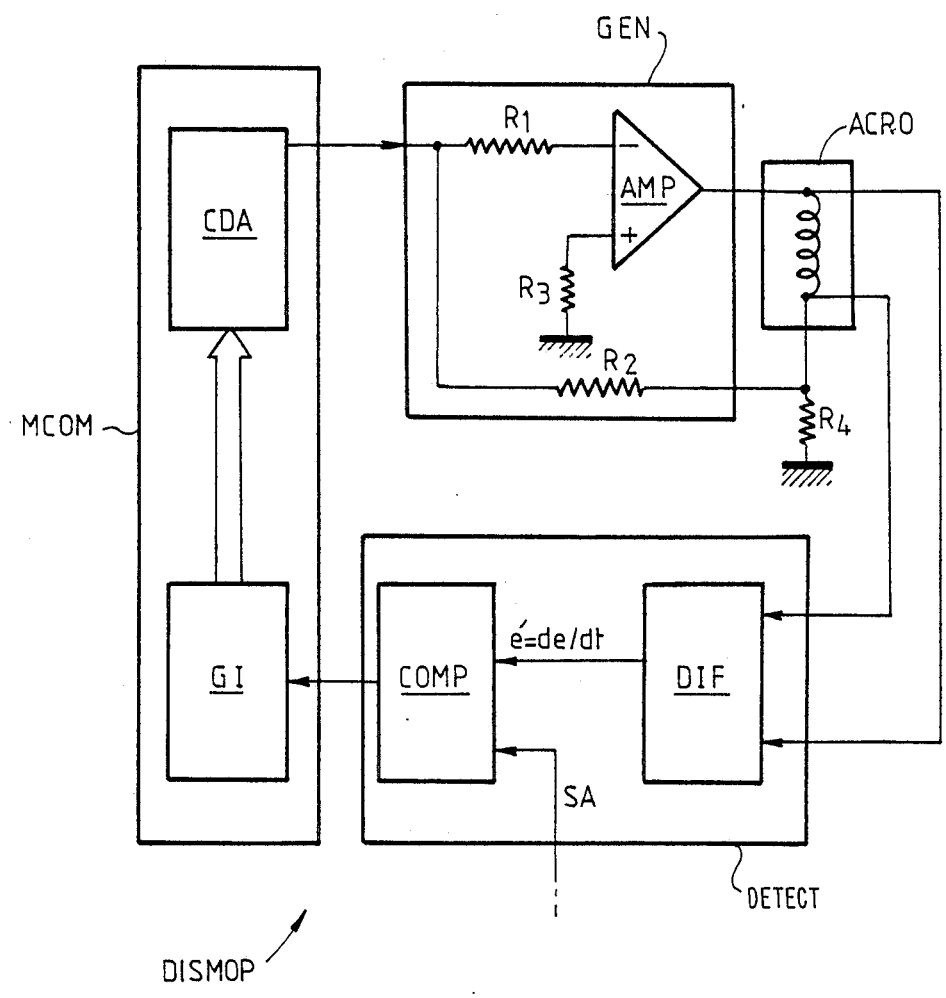
FIG. 7 is a schematic diagram of the apparatus for a head displacement and loading system according to the invention.

The apparatus for controlling the movement of system SCT during phases 1, 2 and 3 and which consequently embodies the method according to the invention is illustrated in FIG. 7 of the drawing, a partial block diagram and partial circuit diagram of apparatus DISMOP for driving system SCT through phases 1, 2 and 3. Apparatus DISMOP of FIG. 7 includes current generator GEN which responds to an input voltage applied thereto to supply a variable current to the armature of motor ACRO. The control voltage supplied to current generator GEN is derived from controller MCOM, which includes digital instruction generator GI, and digital to analog converter CDA. Connected across the armature of motor ACRO are input terminals of detector DETECT which responds to the back emf derived across the motor armature and differentiates same to derive a control voltage which is supplied to controller MCOM.

Detector DETECT includes a differentiator DIF having a pair of input terminals connected across the armature terminals of motor ACRO. Differentiator DIF responds to the rate of change of the voltage across the terminals of the armature of motor ACRO to derive an output voltage $e'=de/dt$. The $e'$ output voltage of differentiator DIF is applied to one input of comparator COMP, having a second input responsive to analog voltage SA, indicative of set point values for $e'$ at the times pin P intersects points A and B. While system SCT is in phase 1, the value of SA is commensurate with the acceleration of system SCT while the system is loading head TEL and when pin P engages break point A. When the system SCT is in phase 2 and is moving toward phase 3, the value of signal SA is commensurate with the acceleration of system SCT when pin P reaches break point B. The value of signal SA also is subject to different values when the system is going from a loaded to a locked position, whereby when system SCT is in phase 3 and pin P is moving toward break point B, the value of signal SA is associated with the acceleration of the system when point B is traversed by pin P. The value of signal SA is commensurate with the acceleration of system SCT when pin P moves from the arcuate region of cam CAM to break point A, on its way toward point A'.

In response to the value of $e'$ being less than the value of signal SA, as occurs at all times except when break points A and B are encountered, comparator COMP derives a binary zero output that has no effect on digital instruction generator GI. However, in response to system SCT having an acceleration associated with break point A or B being encountered, the value of $e'$ exceeds the value of signal SA, causing comparator COMP to derive a binary 1 output level. The binary 1 output level of comparator COMP is coupled to digital instruction generator GI to increment the algorithm or program stored by the instruction generator.

Voltage to current converter or generator GEN includes differential amplifier AMP having a positive input terminal connected to ground through resistor $R_3$ and a negative input terminal connected to resistor $R_1$ responsive to the output voltage of controller MCOM and to a voltage indicative of the back emf across the terminals of the armature of motor ACRO. The voltage indicative of the back emf of the armature of motor ACRO is derived by connecting one terminal of the armature to a terminal of resistor $R_4$, having a second terminal which is grounded. The common terminal of the armature of motor ACRO and resistor $R_4$ is connected via resistor $R_2$ to resistor $R_1$. Generator GEN converts the voltages supplied to it by controller MCOM and the back emf of motor ACRO into current pulses that are supplied back to the motor armature. Hence, controller MCOM derives voltages which are replicas of the current waveforms illustrated in FIGS. 5A, and generator GEN converts these voltage waveforms into current waveforms which drive the armature of motor ACRO.

Controller MCOM includes digital instruction generator GI which derives multibit binary signals that are coupled to digital-to-analog converter CDA. In a preferred embodiment, instruction generator GI is a microprocessor containing a microprogram for supplying a sequence of binary instruction signals to converter CDA in accordance with an algorithm represented by the flow diagram of FIG. 8. For each binary bit sequence supplied by generator GI to converter CDA the converter derives a corresponding voltage output which is transformed into a current impulse by generator GEN.

Figure 8:
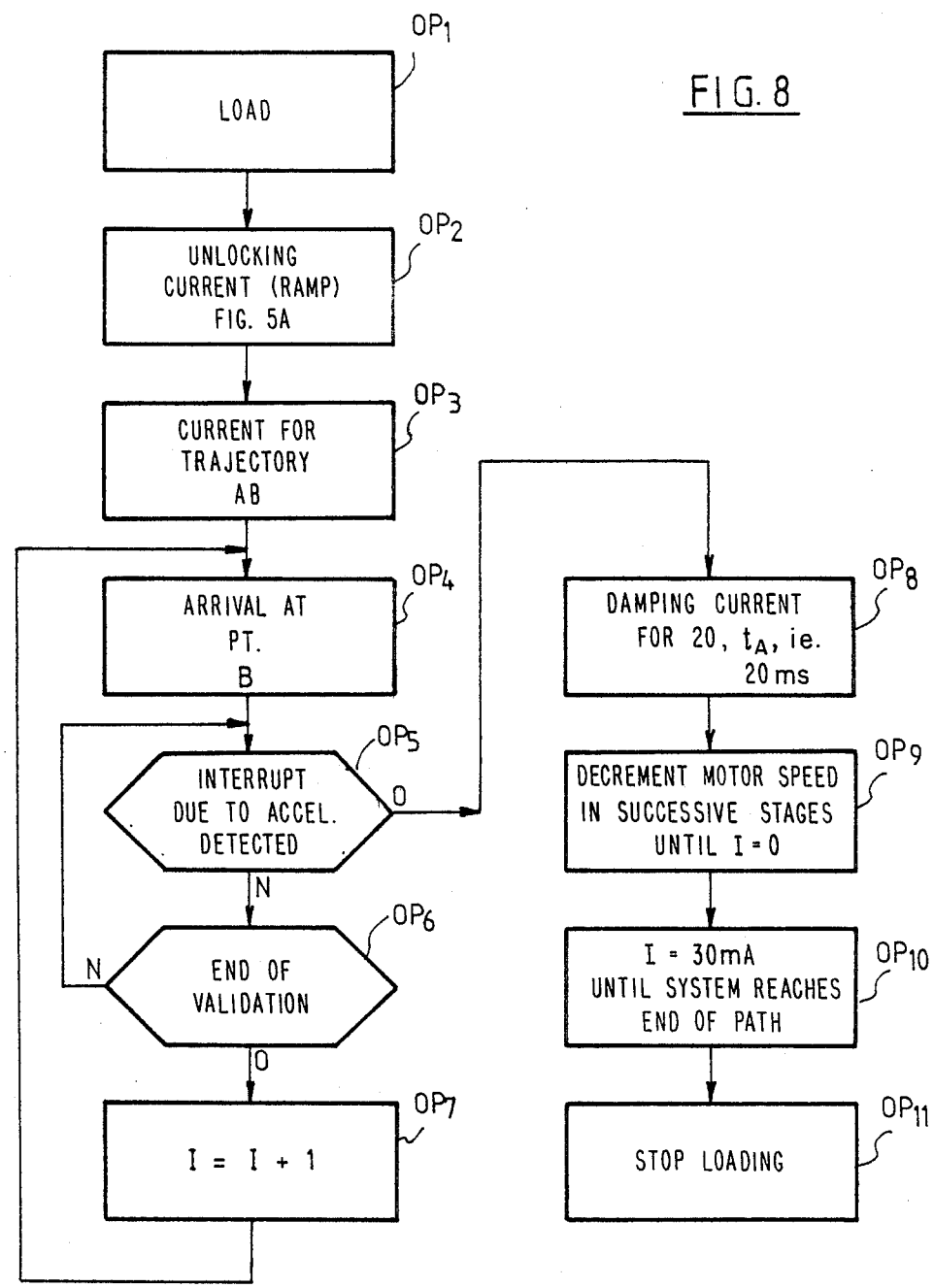
FIG. 8 is a flow diagram of an operating algorithm of the apparatus shown in FIG. 7.

The operations performed by instruction generator GI are listed in the flow diagram of FIG. 8. The flow diagram of FIG. 8 includes operations $OP_1$–$OP_{11}$. During operation $OP_1$, a command to load head T on the planar face of disk DISC is derived. Then operation $OP_2$ is executed, during which the current ramp of FIG. 5A is derived to unlock system SCT and to apply a signal SA to comparator COMP of detector DETECT commensurate with the derivative of the back emf derived by motor ACRO when pin P reaches break point A during the loading operation.

Instruction generator GI remains at operation $OP_2$ until system SCT drives pin P to point A, as indicated by a binary 1 output of comparator COMP. In response to the binary 1 output of comparator COMP, digital instruction generator GI is incremented to operation $OP_3$. During operation $OP_3$, instruction generator GI derives a binary signal that reduces the output voltage of converter CDA from the value associated with the waveform of FIG. 5A at time $T_1$ to the value associated with the waveform of FIG. 5B at time $T_1$. Digital instruction generator GI now causes system SCT to enter phase 2, causing the amplitude of signal SA to change to a value associated with the derivative of the back emf, $e'$, derived by differentiator DIF when pin P reaches break point B during the loading operation.

Instruction generator GI is incremented to operation $OP_4$ immediately after the value of signal SA has been changed and the instruction generator has derived a binary word commensurate with the amplitude of the current impulse $I_1$ at time $T_1$. During operation $OP_4$, instruction generator GI monitors the output of comparator COMP to determine if a binary 1 level is derived by the comparator. If a binary 1 signal is not derived by comparator COMP for a period equal to the length of validation time $t_v$, instruction generator GI is advanced to operation $OP_5$. During operation $OP_5$ the output of comparator COMP is monitored. In response to a binary 1 being derived by comparator COMP, instruction generator GI is advanced to operation $OP_8$, to indicate that pin P has moved across the arcuate portion of the camming surface of cam CAM to break point B. If a binary zero output is derived by comparator COMP instruction generator GI is advanced to operation $OP_6$. During operation $OP_6$ the time that instruction generator GI has been commanding derivation of impulse of $I_1$ is checked to determine whether the duration of the impulse is equal to validation time $t_v$. If instruction generator GI has been instructing derivation of impulse $I_1$ for a time less than validation time $t_v$, operation $OP_6$ is repeated. If instruction generator GI has been instructing derivation of impulse of $I_1$ for a time equal to validation time $t_v$, instruction generator GI is stepped to operation $OP_7$. During operation $OP_7$, instruction generator GI derives a new binary signal value, commensurate with the amplitude of current impulse $I_2$.

Figure 5C:
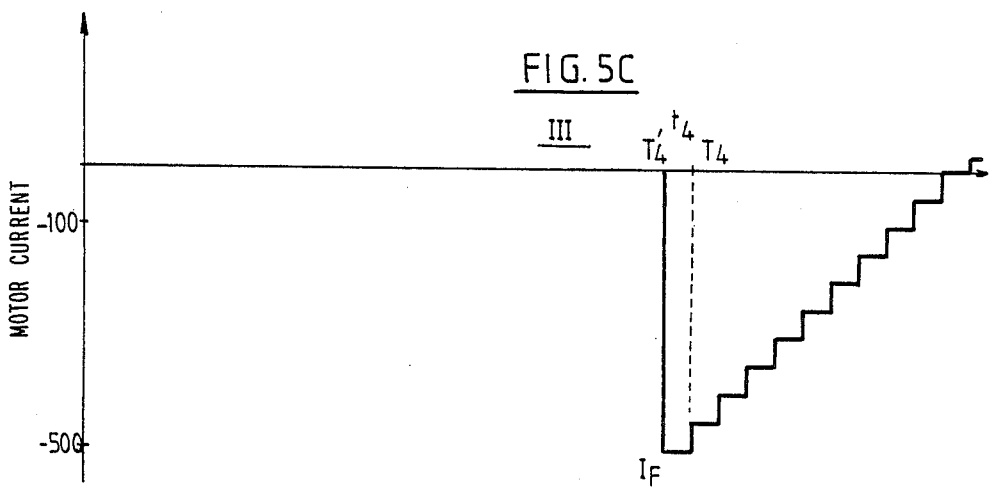

If as a result of operation $OP_5$, instruction generator GI is stepped to operation $OP_8$, the instruction generator derives a binary signal value commensurate with the amplitude and polarity of current impulse $I_F$, as subsists at the beginning of phase 3, during time interval $T_4$, between times $T'_4$ and $T_4$, as indicated in FIG. 5C. When instruction generator GI remains in operation $OP_8$ for an interval equal to $t_4$, the instruction generator is stepped to operation $OP_9$. During operation $OP_9$, instruction generator GI supplies sequential, decreasing binary signal values to converter COA to derive the stair step waveform of FIG. 5C starting at time $T_4$, and ending when instruction generator GI derives a binary signal commensurate with a zero value for the output current of generator GEN. When instruction generator GI derives a binary value associated with a zero current output of generator GEN, the instruction generator is advanced to operation $OP_{10}$. Typically, instruction generator GI stays in operation $OP_9$ for an interval ranging from 200 to 300 milliseconds.

In operation $OP_{10}$, instruction generator GI supplies a binary signal to converter CDA to drive motor ACRO with a current having a positive value, typically equal to 30 milliamperes. The positive current impulse I derived by generator GEN during operation $OP_{10}$ is applied to motor ACRO until system SCT reaches the end of its travel, frequently referred to as the forward stop. When the forward stop is reached, instruction generator GI is advanced to operation $OP_1$ during which the end-of-loading command is derived by the instruction generator. Thereafter, motor ACRO is controlled by signals from a computer with which the magnetic disk memory is associated, to retrieve data from designated annular data tracks of disk DISC.

While there has been described and illustrated one embodiment of the invention, it will be clear that variations in the details of the embodiment specifically illustrated and described may be made without departing from the true spirit and scope of the invention as defined in the appended claims.

What is claimed is:

1. A method of displacing an output element with a shaft of an electric motor, the method comprising the steps of: activating the motor to drive the element along a given trajectory from a point of departure to a given destination point of the trajectory by applying a control current to the motor in such a way as to cause the initial speed of the element to be in a predetermined range between maximum and minimum predetermined values, the element being subjected to a sudden acceleration less than a maximum value causing the speed of the element to be unstable and undetermined, applying a damping current to the motor to cause the motor shaft to have an angular velocity reduced to a reference angular velocity such that the element has a reference speed, the element being subjected to a driving force having an intensity which decreases as a function of the distance of the element from the departure point and to constant resistive forces for the duration of the particular cycle of travel of the element over the trajectory, the resistive forces being subject to variation from one trajectory cycle to another, and then controlling the speed of the element by supplying the motor with a current having an amplitude that decreases from the value of the damping current, the decreasing current varying such that the velocity of the driven element is in a predetermined range when the element arrives at the destination point so the object arrives at the destination point with a velocity falling within a predetermined range.

2. The method of claim 1 wherein the damping current causes the reference velocity and reference speed to be zero.

3. The method of claim 2 wherein the polarity of the damping current causes the motor to exert a resistive force on the element in a direction opposite to a driving force applied to the motor immediately prior to the element reaching the departure point, the amplitude of the damping current being a function of the intensity of the maximum driving force, the duration of the damping current being a function of the duration of a transitional operation required to immobilize the movable system.

4. The method of claim 2 wherein the decreased current applied to the motor enables motion of the motor to be resumed, the decreased current having an average linear variation that continues until the linear variation reaches a zero value.

5. Apparatus for driving a transducer head of a magnetic disk memory between a position proximate the periphery of a disk of the memory and an area on the disk where data are located while lowering the head between an idle position and a hovering position above a plane defining a face of the disk, the head arriving at the position proximate the disk periphery from a position beyond the disk periphery with a velocity in a predetermined velocity range, the apparatus comprising an assembly for carrying the head, the assembly including a radially extending arm, a rotary DC motor for turning the arm, the assembly including mechanical structure synchronized with the turning of the assembly so that as the head is driven between the position proximate the disk periphery and the position where data are located on the disk the head moves between the idle and hovering positions, means for driving the motor so the head is moved between the positions proximate the disk periphery and an edge of the area on the disk where data are located, said driving means supplying an excitation waveform to the motor as the motor drives the head between the positions proximate the disk periphery and the edge of the data, the waveform including an initial constant value having a predetermined interval to cause the motor to have a predetermined angular velocity at the completion of the interval even though the velocities of the head and motor are indeterminate as the head initially leaves the position proximate the disk periphery toward the edge of the data, the initial constant value of the waveform being followed by a ramp having a decreasing amplitude, the ramp having a shape so that the motor angular velocity is maintained constant, without overshoot, at the predetermined angular velocity for a substantial interval after the completion of the predetermined interval and causing the motor angular velocity to be constant as the head approaches and arrives at the edge of the data at the completion of the ramp, when the ramp has a value of zero.

6. The apparatus of claim 5 wherein the ramp has a linear average variation from the time the initial constant value of the waveform is completed until the waveform has a zero value.

7. Apparatus for driving a member from a first predetermined location to a second predetermined location, the member being driven to the first predetermined location on its way to the second predetermined location, with an indeterminate velocity in a predetermined velocity range, the apparatus comprising a DC motor for driving the member, means for activating the motor so the member is driven from the first location to the second location, said activating means supplying an excitation waveform to the motor, the excitation waveform including an initial constant value having a predetermined interval to cause the motor to have a predetermined angular velocity at the completion of the interval so the initial speed of the element is in a predetermined range between maximum and minimum predetermined values, the element being subjected to a sudden acceleration less than a maximum predetermined value causing the speed of the element to be unstable and undetermined, applying a damping current to the motor to cause the motor shaft to have an angular velocity reduced to a reference angular velocity such that the element has a reference speed, the waveform including a ramping portion having a decreasing amplitude following the completion of the predetermined interval, the ramping portion of the waveform having a shape causing the motor angular velocity to be maintained at the predetermined velocity for a substantial interval after completion of the predetermined interval and causing the motor angular velocity to have a constant value as the member approaches and arrives at the second location.

8. A method of loading a transducer head of a magnetic disk, the method comprising the steps of:
mechanically driving said head with a DC motor having an output shaft coupled to the head via a mechanism including a cam follower driven by the shaft along a cam surface having first, second and third segments, the second and third segments being separated by a break point, the mechanism being subjected to constant resistive forces for the duration of each particular cycle, the resistive forces having a tendency to vary substantially from one cycle to another cycle, the mechanism including structure synchronized with turning of the shaft to cause the head to be moved from an idle position when the cam follower is at the break point to a hovering position when the cam follower is driven to a destination point on the third segment, activating the mechanism to drive the head from a position outside of the disk periphery to a position adjacent the disk periphery, the head moving from the disk periphery to a position at an edge of data tracks on the disk in response to the shaft driving the mechanism so that the cam moves to follower a second break point,
applying a control excitation impulse to the motor when the cam follower reaches the break point from the second segment, the control excitation impulse having a predetermined value and duration to cause the shaft to have a predetermined reference angular velocity at the completion of the duration of the control excitation impulse so that the mechanism has a predetermined velocity to overcome the inertia of the mechanism when it reaches the break point from the second segment.

9. The method of claim 8 further comprising the steps of supplying the motor with an excitation waveshape which decreases in amplitude immediately after the control excitation impulse has been applied to the motor, the control excitation impulse exciting the motor so that the mechanism has a velocity between the maximum and minimum values at the time the cam follower reaches the destination point on the third segment.

10. The method of claim 9 wherein the control excitation impulse is a damping impulse for causing the mechanism to have zero velocity at the completion of the control excitation impulse duration.

11. The method of claim 10 wherein the excitation waveshape applied to the motor immediately after the damping impulse has terminated ramps toward a zero value with a slope such that the motor velocity remains substantially at zero without overshoot for an appreciable time interval and the motor velocity then is driven by the ramping waveshape to a predetermined constant value as the ramping waveshape approaches a zero value and at the time the ramping waveshape has a zero value.

12. The method of claim 11 further comprising the step of applying a brief impulse having a polarity opposite to that of the ramping waveshape to the motor immediately after the ramping waveshape goes through a zero value.

13. The method of claim 8 further comprising the step of monitoring the system acceleration and comparing the system acceleration with predetermined values therefore to determine when the head is at the break point.

14. The method of claim 13 wherein the system acceleration is determined by monitoring back emf generated by the motor, differentiating an indication of the generated back emf to derive an indication of the derivative of the back emf with respect to time, and comparing the indication of the derivative of the back emf with respect to time with a predetermined constant.

15. Apparatus for driving a transducer head of a magnetic disk memory between a second position proximate the periphery of a disk of the memory and a third position inside of the periphery of the disk at the edge of data tracks on the disk, the apparatus comprising an assembly for carrying the head, the assembly including a radially extending arm, a rotary DC motor for turning the arm, the assembly including mechanical structure synchronized with turning of the arm so that as the head is moved between the second and third positions the head moves between an idle position in a plane above a face of the disk and a hovering position where the head is located to operatively transduce magnetic data on the disk, means for detecting when the head arrives at the second position, and means responsive to said detecting means for driving the motor so the head is moved between said second and third positions, said driving means: supplying a excitation waveform having a predetermined polarity to the motor while the head is at the second position and is being driven toward the third position, the excitation waveform including an initial constant value having a predetermined interval causing the motor to have a predetermined angular velocity at the completion of the interval, the waveform including a ramp following the initial constant value thereof, the ramp causing the motor angular velocity to remain at the predetermined angular velocity it had at the completion of the predetermined interval for a substantial time period so that the motor shaft and head do not overshoot and oscillate, the ramp decreasing toward zero from the initial constant value to cause the motor shaft angular velocity to have a constant predetermined value at the time the head approaches and arrives at the third position.

16. The apparatus of claim 15 wherein the assembly includes a cam follower for engaging a stationary cam surface, the cam surface having second and third segments, the second and third segments being separated by a break point, a mechanism driving the cam follower so that as the head moves between the second and third positions the cam follower moves along the second and third segments of the cam, respectively.

17. The apparatus of claim 15 wherein said means for detecting includes means for effectively detecting the acceleration of the member and for comparing the determined acceleration with a constant value therefor associated with the acceleration of the member at the second position.

18. The apparatus of claim 17 wherein the means for effectively determining acceleration includes means for monitoring back emf across an armature of the DC motor, and means for differentiating the monitored back emf.

* * * * *